(12) United States Patent
Stebbings et al.

(10) Patent No.: US 8,170,166 B2
(45) Date of Patent: May 1, 2012

(54) METHODS AND SYSTEMS FOR COMBINING TIMING SIGNALS FOR TRANSMISSION OVER A SERIAL INTERFACE

(75) Inventors: Kenneth E. Stebbings, Grayslake, IL (US); Vivek Bhan, Chandler, AZ (US); Daniel B. Schwartz, Scottsdale, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 601 days.

(21) Appl. No.: 12/392,841

(22) Filed: Feb. 25, 2009

(65) Prior Publication Data

US 2010/0215133 A1 Aug. 26, 2010

(51) Int. Cl.
*H04L 7/00* (2006.01)

(52) U.S. Cl. ........ 375/354; 375/219; 375/220; 375/295; 375/364; 375/365; 375/366; 375/368; 370/272; 370/273; 370/276; 370/297; 370/503; 370/508; 370/509; 370/510; 370/511; 370/512; 370/513; 370/514; 455/39; 455/73; 455/91; 455/502

(58) Field of Classification Search .......... 375/219, 375/220, 295, 354, 364, 365, 366, 368; 455/39, 455/73, 91, 502; 370/272, 273, 276, 297, 370/503, 508–514
See application file for complete search history.

(56) References Cited

U.S. PATENT DOCUMENTS

| 6,195,724 | B1 | 2/2001 | Stracovsky et al. |
| 6,430,642 | B1 | 8/2002 | Stracovsky et al. |
| 6,961,539 | B2 | 11/2005 | Schweinhart et al. |
| 2009/0253451 | A1* | 10/2009 | Trachewsky .......... 455/509 |

OTHER PUBLICATIONS

MIPI Alliance, Inc., Draft MIPI Alliance Specification for Dual Mode 2.5G/3G Baseband/RFIC Interface, Version 3.09.04 Apr. 1, 2008.
MIPI Alliance, Inc., Draft MIPI Alliance Specification DigFRv4, Version 0.60.00, Jul. 23, 2008.

* cited by examiner

*Primary Examiner* — Leon Flores
(74) *Attorney, Agent, or Firm* — Ingrassia Fisher & Lorenz, PC

(57) ABSTRACT

Apparatus, systems, and methods are provided for transmitting messages over a serial interface. A method comprises receiving a first signal at a first time and receiving a second signal at a second time, the second time being after the first time. If a difference between the second time and the first time is less than a threshold time period, the method comprises generating a first message that is representative of the first signal and the second signal and transmitting the first message over the serial interface. In accordance with one embodiment, the threshold time period is equal to one half of an interface acquisition delay time period associated with the serial interface.

20 Claims, 3 Drawing Sheets

METHODS AND SYSTEMS FOR COMBINING TIMING SIGNALS FOR TRANSMISSION OVER A SERIAL INTERFACE

TECHNICAL FIELD

Embodiments of the subject matter described herein relate generally to serial communications between electronic modules, and more particularly, embodiments of the subject matter relate to methods and systems for transmitting timing signals over a serial interface in a radio frequency transceiver.

BACKGROUND

Many electronic systems utilize modular design techniques to subdivide a complex system into individual modules, such as integrated circuits (ICs), rather than developing and implementing the complex system in its entirety as a single module. For example, most radio frequency (RF) transceivers utilize separate modules for baseband signals and RF signals. For example, to transmit data, a baseband module (e.g., a baseband integrated circuit or BBIC) generates the digital data, and a RF module (e.g., a RF integrated circuit or RFIC) translates the digital data from the baseband module into an analog RF signal that is provided to an antenna. Similarly, to receive data, the RF module converts an incoming RF signal received at the antenna into a digital form suitable for subsequent demodulation and/or processing by the baseband module.

In most transceiver systems, the baseband module generates timing signals for controlling when the RF module initiates a time-sensitive action, for example, increasing (or ramping) the power output of the power amplifier. Because of the time-sensitive nature of the timing signals, the performance and/or reliability of the transceiver may be adversely affected if the timing signals are not received by the RF module with precise timing. Prior art transceiver systems utilize parallel communications (or alternatively, a parallel interface) between the baseband module and the RF module. In these systems, the baseband module includes one or more communication channels dedicated to a particular timing signal, and the RF module includes corresponding communication channels. For example, the ICs may each include a pin dedicated to a particular timing signal, and the respective pins may be directly connected (e.g., via a trace or wire), thereby ensuring that the timing signals are accurately and reliably received by the RF module.

Modern transceiver systems utilize serial communications (or alternatively, a serial interface) between the baseband module and the RF module. The previously used parallel communication channels are consolidated into a shared serial communication channel and the baseband and RF modules are modified to support serialized messages (e.g., packets or frames) which convey information previously communicated in parallel. A scheduling mechanism manages or controls the order in which messages (e.g., packets or frames) are transmitted from the baseband module over the serial interface. Often, the packets are scheduled in a first in first out (FIFO) ordering. Generally, to accommodate the time-sensitive nature of timing signals, the scheduling mechanism in the baseband module interrupts the message stream and inserts a message representative of a timing signal within the message stream to ensure that it is received by the RF module substantially in real-time (e.g., at a fixed amount of time after the timing signal occurs). To prevent collisions, many communication standards and/or protocols guarantee that timing signals will not occur simultaneously or very close together (e.g., less than the minimum amount of time required to transmit an individual timing message). For example, the Universal Mobile Telecommunications System (UMTS) standard requires an offset of 1025 chips between receive (RX) and transmit (TX) slots, resulting in a time difference of 1024 chips between individual timing signals.

Many next generation standards and/or protocols allow for two timing signals to be generated simultaneously or very close together. The prior art scheduling mechanism transmits the timing messages in the order that the timing signals were received, i.e., the first timing message followed by the second timing message. The receipt of the second timing message at the RF module is delayed by transmission of the first timing message, and as a result, the second timing message is not received by the RF module substantially in real-time (i.e., a fixed amount of time after the second timing signal occurs). This delay in receiving the second timing message (the timing error) impacts the performance and/or reliability of the transceiver system, and can affect compliance with various communications standards or other applicable regulations.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
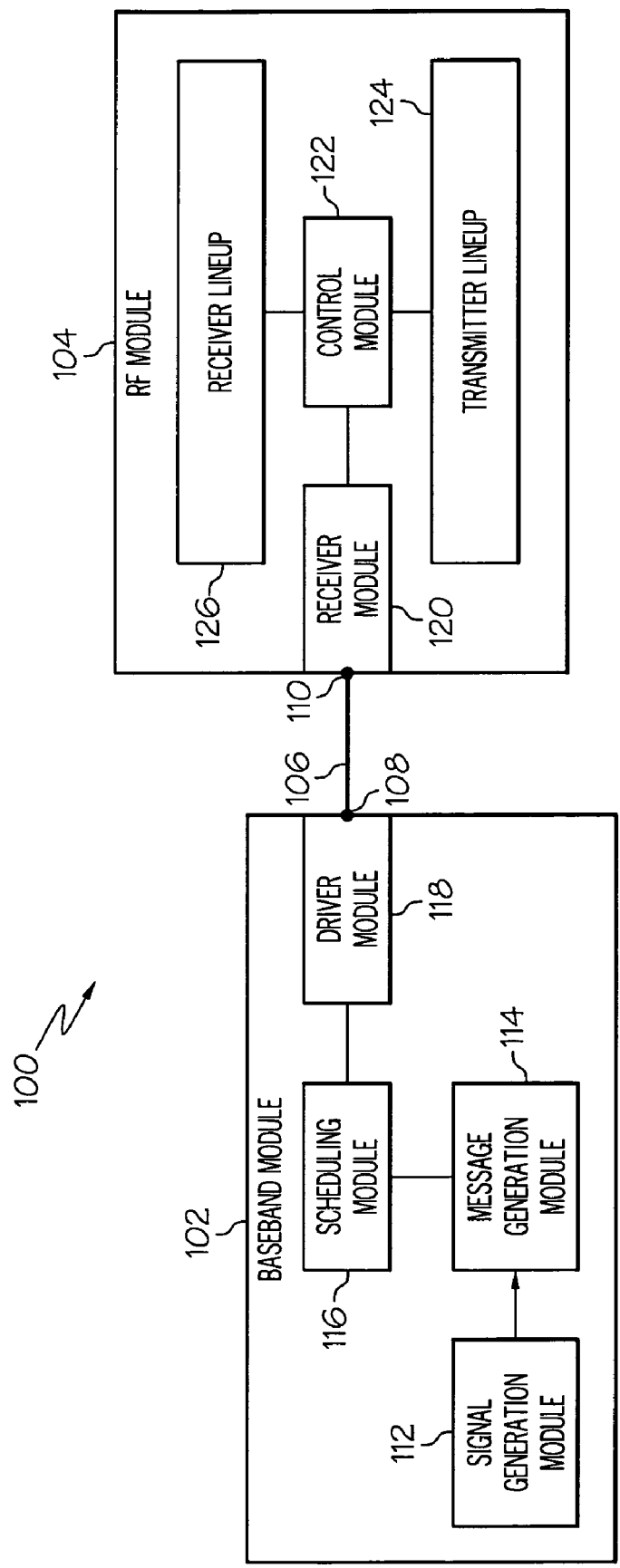
FIG. 1 is a block diagram of a transceiver in accordance with one embodiment of the present invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

The following description refers to elements or nodes or features being "coupled" together. As used herein, unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to transmitter design, receiver design, transceiver design, baseband programming, sampling, serial communications, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by software code representation thereof.

Technologies and concepts discussed herein relate to systems and methods for transmitting timing signals over a serial interface in radio frequency (RF) transceivers. In this regard, it should be appreciated that although the subject matter may be described herein in the context of a RF transceiver, the subject matter described herein applies to any system that utilizes serialized messages (e.g., packets or frames) to convey timing information between modules over a serial interface. As described in greater detail below, in an exemplary embodiment, the baseband module combines timing signals generated and/or received within one half of an interface acquisition delay time period after a first timing signal into a combined timing message, which is subsequently transmitted over a serial interface and deconstructed into the respective timing signals by the RF module. As a result, the worst case timing error for the RF transceiver is reduced by a factor of two and reduces the number of bits and/or serialized messages that need to be transmitted.

FIG. 1 depicts a transceiver 100 in accordance with one embodiment. In an exemplary embodiment, the transceiver 100 is realized as a RF transceiver. The transceiver 100 includes, without limitation, a baseband module 102, a RF module 104, and a serial interface 106. Various implementation aspects of RF transceivers are well known and so, in the interest of brevity, many conventional steps or elements will only be mentioned briefly herein or will be omitted entirely without providing the well known details. In an exemplary embodiment, the RF module 104 generates analog RF output signals based on serialized digital data from the baseband module 102 received via the serial interface 106. In this regard, the transceiver 100 may be realized for use in a mobile device application, such as a cellular telephone that operates in accordance with a communications standard, such as, for example, the global system for mobile communications (GSM), wideband code division multiple access (WCDMA), long term evolution (LTE) standards, worldwide interoperability for microwave access (WiMax), or another suitable communications standard. In an exemplary embodiment, the various components of the transceiver 100 are suitably configured such that the transceiver is compliant with a DigRF standard (e.g., DigRF 3G, DigRF 4G) or another suitable interface standard.

It should be understood that FIG. 1 is a simplified representation of a transceiver 100 for purposes of explanation and ease of description, and FIG. 1 is not intended to limit the subject matter in any way. Practical embodiments may include other devices and components for providing additional functions and features, and/or the transceiver 100 may be part of a transceiver or a larger system, as will be understood. In this regard, it should be understood that although the subject matter may be described in the context of a serial interface for transmitting transmit data from the baseband module 102 to the RF module 104, the subject matter may be implemented in a like manner for transmitting receive data from the RF module 104 to the baseband module 102. Furthermore, although FIG. 1 depicts a single baseband module 102 and a single RF module 104, in practice, additional baseband modules and/or RF modules may be present in some embodiments.

In an exemplary embodiment, the baseband module 102 includes an output port 108 which is coupled to an input port 110 of the RF module 104 via the serial interface 106. As used herein, a "port" means a node (e.g., a reference point, connection point, junction, signal line, or the like, at which a given signal, logic level, voltage, data pattern, current, or quantity is present) that is externally accessible via, for example, a physical connector, an input or output pin, a test probe, a bonding pad, or the like. In this regard, in an exemplary embodiment, the baseband module 102 and the RF module 104 are realized as physically distinct and/or separate electrical components which, depending on the embodiment, may or may not be implemented as part of the same electronic device package. In an exemplary embodiment, the baseband module 102 and the RF module 104 are preferably realized as separate and distinct integrated circuits. As described in greater detail below, the baseband module 102 generates serialized digital data (e.g., data and/or information encapsulated or formatted into messages, packets, frames, and the like) that represents configuration information for the RF module 104 and/or content to be transmitted by the RF module 104, and the baseband module 102 transmits the serialized data to the RF module 104 via the serial interface 106, as will be appreciated in the art. The RF module 104 receives the serialized data from the baseband module 102 via the input port 110 and translates the serialized data into the content and/or configuration information for generating analog RF output signals. In this regard, the serial interface 106 may be understood as comprising a transmit data link. In various embodiments, the serial interface 106 may be realized as a single wire, conductive trace, bondwire or wire bond, bump, die-to-die interconnect, ball, stud, another suitable interconnection and/or a suitable combination thereof. In an exemplary embodiment, the serial interface 106 is operated with a frequency such that the transceiver 100 is compliant with one or more communications standards. For example, depending on the embodiment, the operating frequency of the serial interface 106 may be 6.5 MHz, 312 MHz, 1248 MHz, 1456 MHz, or another suitable frequency. Although the subject matter is described herein in the context of a serial interface from the baseband module 102 to the RF module 104, it should be appreciated that the subject matter described herein may be implemented in a similar manner for a serial interface from the RF module 104 to the baseband module 102 (e.g., a receive data link).

In an exemplary embodiment, the baseband module 102 includes, without limitation, a signal generation module 112, a message generation module 114, a scheduling module 116, and a driver module 118. These, and possibly other components, may be coupled together and suitably configured to support operation of the baseband module 102 as described in greater detail below. In an exemplary embodiment, the baseband module 102 is realized as an integrated circuit (e.g., the baseband integrated circuit or BBIC). In an exemplary embodiment, the baseband module 102 transmits time-sensitive messages (e.g., timing messages or timing strobes) for configuring and/or controlling one or more characteristics of the RF module 104 substantially in real-time during operation of the transceiver 100. In an exemplary embodiment, if two or more timing signals occur within one half of an interface acquisition delay time period for the serial interface 106, the baseband module 102 generates a combined timing message representative of the two or more timing signals and transmits the combined timing message to the RF module 104 over the serial interface 106, as described in greater detail below.

In an exemplary embodiment, the signal generation module 112 is coupled to the message generation module 114, which in turn is coupled to the scheduling module 116. The scheduling module 116 is coupled to the driver module 118, which in turn is coupled to the serial output port 108. The signal generation module 112 represents the hardware, software, and/or firmware components of the baseband module 102 which are configured to generate timing signals and/or other configuration information (or control information) for the RF module 104. It should be appreciated that although FIG. 1 depicts a single signal generation module 112, in practice, numerous signal generation modules 112 may be present. Depending on embodiment, the signal generation module 112 may be realized as a general purpose processor, a digital signal processor, an application specific integrated circuit, a field programmable gate array, any suitable programmable logic device, discrete gate or transistor logic, discrete hardware components, or any combination thereof, designed to perform the functions described herein. The message generation module 114 represents the hardware, software, and/or firmware components of the baseband module 102 which are configured to receive the timing signals generated by the signal generation module 112 and generate timing messages representative of the received timing signals, which may be subsequently transmitted via the serial interface 106. In this regard, the timing messages comprise a serialized representation of the timing signals, as described in greater detail below. In an exemplary embodiment, the message generation module 114 is configured to generate a combined timing message based on two or more timing signals received within one half of an interface acquisition delay time period, as described in greater detail below.

In an exemplary embodiment, the scheduling module 116 represents the hardware, software, and/or firmware components of the baseband module 102 which are configured to schedule or otherwise control the order in which serialized data or messages received by the scheduling module 116 are transmitted to the RF module 104. In this regard, the scheduling module 116 implements a suitable scheduling algorithm such that the timing messages received by the scheduling module 116 are transmitted over the serial interface 106 with precise timing by delaying other less time-sensitive messages or frames. In this regard, the scheduling module 116 may implement one or more queues or FIFOs, for messages and/or frames of differing types and/or priority levels, as will be appreciated in the art. Depending on the embodiment, the scheduling module 116 may interrupt transmission of other frames (e.g., non-timing messages) and transmit the timing messages, such that they are nested in other frames (e.g., the entire timing message is sent between two separate portions of an interrupted message), as will be appreciated in the art. The driver module 118 is configured to electrically drive the serial output port 108 and/or serial interface 106 to create the serialized data and/or messages provided by the scheduling module 116 on the serial interface 106 in a conventional manner, as will be appreciated in the art.

In an exemplary embodiment, the scheduling module 116 is configured to transmit a timing message representative of a particular timing signal over the serial interface 106 within an interface acquisition delay time period after the occurrence of the timing signal, as described in greater detail below. In this regard, the interface acquisition delay time period represents the amount of time required to ensure that an uninterruptable message and/or frame (e.g., a timing message) currently being transmitted via the serial interface 106 can be completely transmitted without interfering with otherwise normal operation of the RF module 104. As such, the interface acquisition delay time period represents a fixed amount of time that the scheduling module 116 must wait in order to guarantee access to the serial interface 106 for a respective timing message, as will be appreciated in the art. In an exemplary embodiment, the interface acquisition delay time period is equal to the length of time it takes to transmit a timing message over the serial interface 106, such that a previously generated timing message may be completely transmitted without interruption. For example, assuming that the timing message is implemented with a 32-bit message format and serial interface 106 is operating at 312 MHz, the interface acquisition delay time period is equal to 108.9 nanoseconds (ns), i.e., the time required for transmitting thirty-two individual bits.

In an exemplary embodiment, the RF module 104 includes, without limitation, a receiver module 120, a control module 122, a transmitter lineup 124, and a receiver lineup 126. These, and possibly other components, may be coupled together and suitably configured to support operation of the RF module 104 as described in greater detail below. In an exemplary embodiment, the RF module 104 is realized as an integrated circuit (e.g., the RF integrated circuit or RFIC), or alternatively, a plurality of integrated circuits packaged into a single module. The receiver module 120 is coupled between the serial input port 110 and the control module 122, and the control module 122 is coupled to the transmitter lineup 124 and the receiver lineup 126.

In an exemplary embodiment, the receiver module 120 is configured to convert an electrical signal on the serial interface 106 to a digital value, which is subsequently converted into a serialized representation (e.g., a message, frame, or packet) by the control module 122. The control module 122 translates or deconstructs the serialized data (e.g., the received message, frame, or packet) into content and/or configuration information for the transmitter lineup 124 and/or receiver lineup 126. In this manner, the control module 122 controls the output of the RF module 104 and/or operation of the transmitter lineup 124 as well as the operation of the receiver lineup 126 in response to the serialized data and/or messages received from the baseband module 102. In an exemplary embodiment, the transmitter lineup 124 comprises a combination of components, such as, digital to analog converters (DACs), digital signal processing elements, multiplexers, mixers, filters, power amplifiers, and the like, which are suitably configured to generate and provide an analog RF signal to an antenna for transmission, as will be appreciated in the art. Similarly, receiver lineup 126 comprises a combination of components, such as, analog-to-digital converters (ADCs), digital signal processing elements, multiplexers, mixers, filters, power amplifiers, and the like, which are suitably configured to demodulate and/or deconstruct an analog RF signal received at an antenna into a digital representation for processing at the baseband module 102, as will be appreciated in the art. As described in greater detail below, the control module 122 is configured to adjust the operating characteristics and/or components of the transmitter lineup 124 and/or receiver lineup 126 in response to receiving a timing message representing one or more timing signals generated by the baseband module 102.

Figure 2:
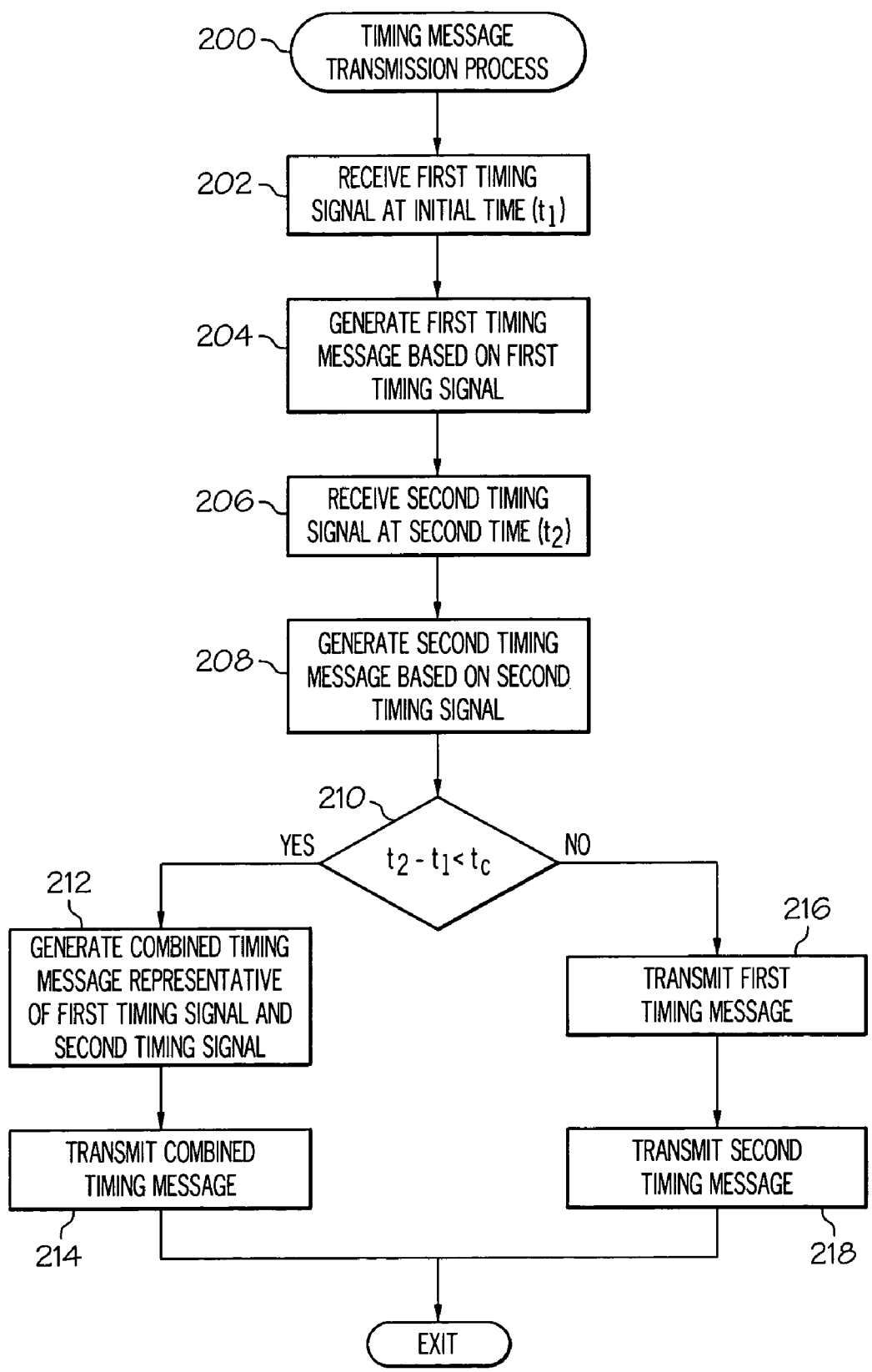
FIG. 2 is a flow diagram of a timing message transmission process in accordance with one embodiment of the present invention.

Referring now to FIG. 2, in an exemplary embodiment, a transceiver 100 may be configured to perform a timing message transmission process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the baseband module 102, the RF module 104, the serial interface 106, the signal generation module 112, the message generation module 114, or the scheduling module 116. It should be appreciated that any number of additional or alternative tasks may be included, and may be incorporated into a more comprehensive procedure or process having additional functionality not described in detail herein.

Referring to FIG. 2, and with continued reference to FIG. 1, a transceiver 100 may perform the timing message transmission process 200 to reduce timing error for the transceiver 100. In this regard, as used herein, timing error refers a variance in the actual time a timing message is transmitted via the serial interface relative to the theoretical time of transmission, wherein the theoretical time of transmission is equal to the time that the respective timing signal is received by the message generation module 114 plus the interface acquisition delay time period. In an exemplary embodiment, the timing message transmission process 200 begins by receiving a first timing signal (or alternatively, timing strobe or strobe signal) at an initial time ($t_1$) and generating a first timing message (or alternatively, timing frame) based on the first timing signal (tasks 202, 204). As used herein, a timing signal or timing strobe should be understood as a signal generated by a component in the baseband module that indicates a timing reference for a particular action or function to be undertaken by a particular component in the RF module. For example, the signal generation module 112 in the baseband module 102 may generate a timing signal that indicates a timing reference for when the RF module 104 should ramp or increase the output power of the generated RF signal (e.g., by increasing the power output capability or headroom of the power amplifier in the transmitter lineup 124). In this regard, the first timing signal may comprise a Timing Accurate Strobe (TAS) signal which is intended to provide a precise timing reference for a time-sensitive action by the RF module 104. In some embodiments, a single timing signal may indicate a timing reference for a plurality of actions or functions to be undertaken by a plurality of components in the RF module.

In an exemplary embodiment, the signal generation module 112 generates the first timing signal which is received by the message generation module 114 at the initial time ($t_1$) (e.g., the time of receipt of the first signal). The message generation module 114 generates a first timing message that comprises a serialized digital representation of the first timing signal that is suitable for communication over a serial interface. In this regard, the first timing message may comprise a Timing Accurate Strobe (TAS) message. In an exemplary embodiment, the first timing message is realized as a frame comprising a plurality of fields. In this regard, a field may be understood as a logical grouping of the serialized bits of the frame. For example, the timing message may include a header field and a payload field. The header field may comprise control information pertaining to the frame type (e.g., timing message) along with the length of the payload field (e.g., 8-bits, 32-bits), while the payload field comprises the particular content (e.g., the payload) of the message being transmitted via the serial interface. In this regard, the message generation module 114 may generate the first timing message having a header field that indicates the first timing message is representative of a timing signal (or alternatively, timing strobe signal) and a payload field that indicates the particular action to be performed by the RF module 104 based on the first timing signal. In an exemplary embodiment, each bit (or each logical grouping of bits) of the payload field of a timing message represents a particular type of timing signal, which is associated with (or corresponds to) a particular component, action, or function of the RF module 104. For example, a first bit (or logical grouping of bits) of the payload field may be associated with a transmission function (e.g., an action to be undertaken by the transmitter lineup 124) and a second bit (or logical grouping of bits) may be associated with a receiver function (e.g., an action to be undertaken by the receiver lineup 126. In an exemplary embodiment, the message generation module 114 generates the first timing message such that the payload field is representative of the first timing signal. For example, if the first timing signal corresponds to a timing reference for the transmission function, the message generation module 114 may generate the first timing message such that the first bit of the payload field is set to a logical '1.'

In accordance with one embodiment, the message generation module 114 includes a timer or another element suitably configured to timestamp the first timing message generated by the message generation module 114 with the time that the first timing signal was received by the message generation module 114 (e.g., time ($t_1$)). In an exemplary embodiment, the scheduling module 116 is notified of an impending timing message in response to receiving the first timing signal at the initial time ($t_1$). As described above, in an exemplary embodiment, the scheduling module 116 and/or baseband module 102 are configured to wait for an interface acquisition delay time period ($t_d$) after the initial time ($t_1$) before transmitting the first timing message. In this regard, the scheduling module 116 may include a timer or another element suitably configured such that the scheduling module 116 waits for the interface acquisition delay time period after being notified of the impending timing message before transmitting messages from the message generation module 114. Depending on the embodiment, the message generation module 114 and/or scheduling module 116 may maintain the first timing message in a register, a random-access memory (RAM), a first-in first-out (FIFO) or queue, a buffer, a latch, or another suitable hardware component before transmitting the first timing message.

In an exemplary embodiment, the timing message transmission process 200 continues by receiving a second timing signal at a subsequent time ($t_2$) and generating a second timing message based on the second timing signal (tasks 206, 208). For example, a signal generation module (e.g., signal generation module 112) generates the second timing signal which is received by the message generation module 114 at time ($t_2$) (e.g., the timestamp of the second timing message). Depending on the embodiment, the second timing signal may be generated by the same or different signal generation module as the first timing signal. In this regard, the second timing signal indicates a particular timing reference for a different action than the first timing signal. For example, if the second timing signal corresponds to the receiver function, the message generation module 114 may generate the second timing message such that the second bit of the payload field is set to a logical '1' and maintain the second timing message in a similar manner as described above.

Figure 3:
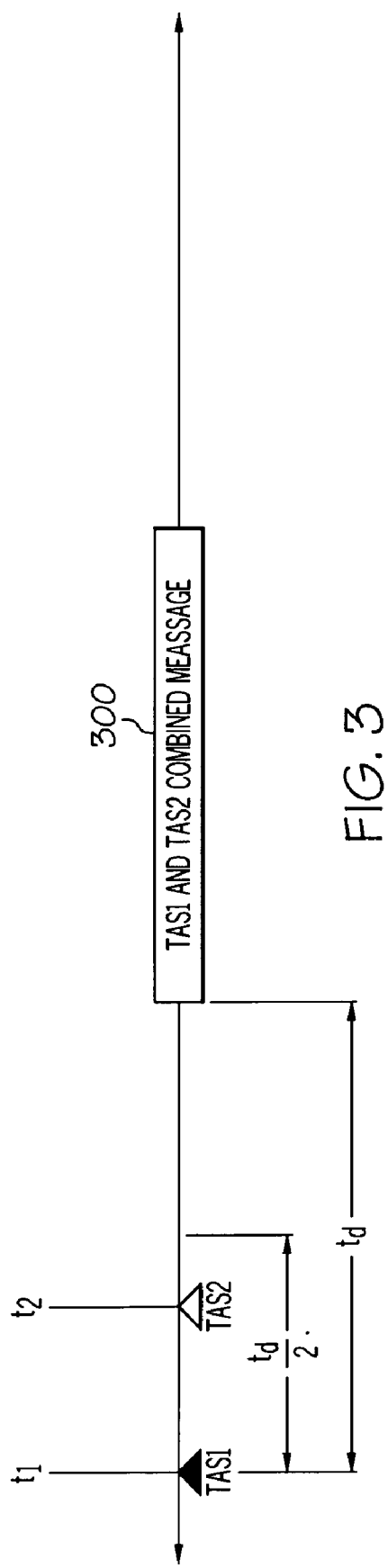
FIG. 3 is a graph showing timing signals and timing message transmission versus time in accordance with one embodiment of the present invention.

Referring now to FIG. 3, and with continued reference to FIG. 1 and FIG. 2, in an exemplary embodiment, the timing message transmission process 200 compares the respective times of receipt for the timing signals and determines the time difference between the first timing signal and the second timing signal. For example, in an exemplary embodiment, the message generation module 114 compares the timestamp of the first timing message ($t_1$) with the timestamp of the second timing message ($t_2$) to determine the difference between the time of receipt for the first timing signal and the time of receipt for the second timing signal. If the difference between the time of the first timing signal ($t_1$) (e.g., the timestamp of the first timing message) and the time of the second timing signal ($t_2$) (e.g., the timestamp of the second timing message) is less than a combination threshold time period (e.g., $t_2 - t_1 < t_c$), the timing message transmission process 200 continues by generating a combined timing message 300 that is representative of the first timing signal and the second timing signal (tasks 210, 212). In this regard, the combination threshold time period represents a predetermined time interval after the time the first timing signal was received, where any additional timing signals received within the combination threshold time period will be combined with the first timing signal to generate the combined timing message. In an exemplary embodiment, the combination threshold time period is equal to one half of the interface acquisition delay time period $$\left(\text{e.g., } t_c = \frac{t_d}{2}\right).$$

For example, as shown in FIG. 3, if the difference in time between a first timing signal (TAS1) and a second timing signal (TAS2) is less than one half of the interface acquisition delay time period $$\left(\text{e.g., } t_2 - t_1 = \frac{t_d}{2}\right),$$

the timing message transmission process 200 generates a combined timing message 300 that is representative of the first timing signal (TAS1) and the second timing signal (TAS2). If the difference between the time of the first timing signal ($t_1$) and the time of the second timing signal ($t_2$) is equal to one half of the interface acquisition delay time period, timing message transmission process 200 may generate a combined timing message that is representative of the first timing signal and the second timing signal. However, in this case $$\left(\text{e.g., } t_2 - t_1 = \frac{t_d}{2}\right),$$

the timing error associated with the second timing signal will be the same as in the case where the timing messages are not combined, as will be appreciated in the art.

In accordance with one embodiment, the timing message transmission process 200 combines the first timing message and the second timing message to obtain the combined timing message. For example, in accordance with one embodiment, the message generation module 114 generates the combined timing message by performing a logical OR operation (or logical disjunction or inclusive disjunction) on the first timing message (e.g., the message representative of TAS1) and the second timing message (e.g., the message representative of TAS2). In an exemplary embodiment, the combined timing message comprises the combined the payloads of the individual timing messages. For example, in accordance with one embodiment, the header field of the first timing message and the header field of the second timing message are identical, since the both messages are of the same type (e.g., both are timing messages) and have the same payload length. As described above, if each bit (or each logical grouping of bits) of the payload fields are associated with a different component or function, then the particular bit(s) of the payload field of the first timing message that are set to logical '1' and the particular bit(s) of the payload field of the second timing message that are set to logical '1' will be different. By performing a bitwise logical OR operation on the payload fields of the respective timing messages, the combined timing message will have a payload field with bit(s) set to logical '1' to indicate both timing signals. For example, the first bit of the payload field of the first timing message is set to a logical '1' for the transmission function and second bit of the payload field of the second timing message is set to logical '1' for the receiver function, the resulting combined timing message has a payload field with the first and second bit each set to a logical '1', thereby indicating both the transmission function and the receiver function. In this manner, the combined timing message generated by the timing message transmission process 200 is representative of the first timing signal and the second timing signal. The header field of the combined timing message may be identical to that of the other timing messages. In this regard, the message generation module 114 may be configured to perform a bitwise logical OR operation on the payload field of the first timing message and the payload field of the second timing message.

In an exemplary embodiment, the timing message transmission process 200 continues by transmitting the combined timing message over the serial interface (task 214). In an exemplary embodiment, the timing message transmission process 200 waits for the interface acquisition delay time period after receiving the first timing signal ($t_1$) before transmitting the combined timing message, as described above. In this regard, the timing message transmission process 200 and/or scheduling module 116 transmits the combined timing message at a transmit time equal to the interface acquisition delay time period after time the first timing signal was received (e.g., the transmit time equals $t_1 + t_d$) as shown in FIG. 3. In an exemplary embodiment, the RF module 104 receives the combined timing message and deconstructs or translates the combined timing message to derive the individual component signals (e.g., TAS1 and TAS2). The RF module 104 continues by adjusting an operating characteristic and/or component of the transmitter lineup 124 based on the first timing signal and adjusting an operating characteristic and/or component of the receiver lineup 126 based on the second timing signal.

Figure 4:
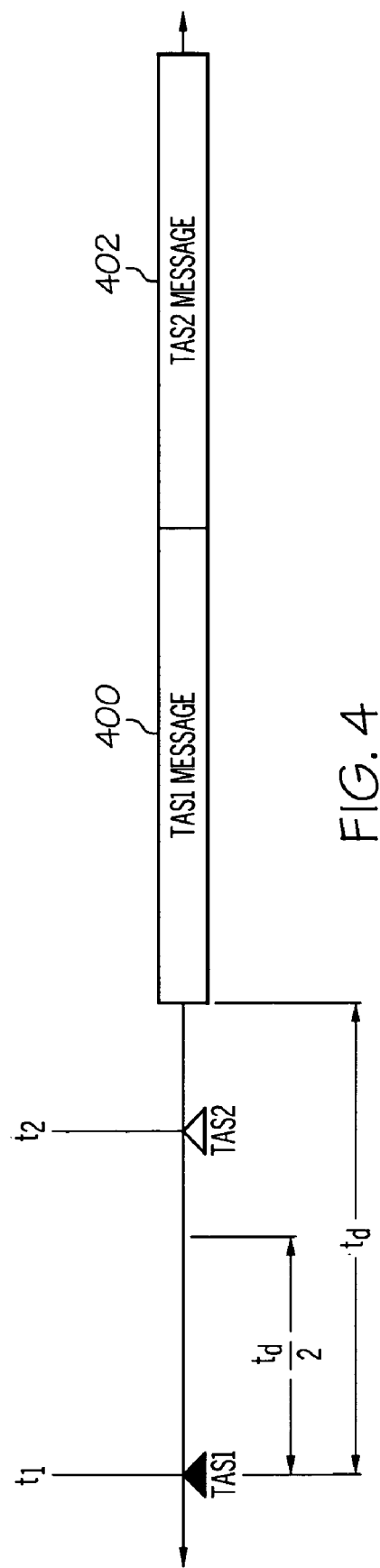
FIG. 4 is a graph showing timing signals and timing message transmission versus time in accordance with one embodiment of the present invention.

Referring now to FIG. 4, and with continued reference to FIG. 1 and FIG. 2, if the difference between the time of the first signal ($t_1$) and the time of the second signal ($t_2$) is greater than the combination threshold time period, the timing message transmission process 200 continues by transmitting the first timing message before transmitting the second timing message (tasks 216, 218). For example, as shown in FIG. 4, if the difference in time between a first timing signal (TAS1) and a second timing signal (TAS2) is greater than one half of the interface acquisition delay time period $$\left(\text{e.g., } t_2 - t_1 > \frac{t_d}{2}\right),$$

the timing message transmission process 200 transmits a first timing message 400 that is representative of the first timing signal (TAS1) before transmitting a second timing message 402 that is representative of the second timing signal (TAS2). In this regard, the timing message transmission process 200 transmits the first timing message 400 at a time equal to the time the first timing signal was received plus the interface acquisition delay period (e.g., $t_1+t_d$). In an exemplary embodiment, the second timing message 402 is transmitted immediately after the first timing message 400. In other words, there are no intervening messages and/or frames sent over the serial interface between the first timing message 400 and the second timing message 402. The time at which the second timing message 402 is transmitted is equal to the transmit time of the first timing message plus the time required to transmit the first timing message 400. In this regard, if the time required to transmit the first timing message 400 is equal to the interface acquisition delay time period, then the transmit time of the second timing message 402 is equal to $t_1+2t_d$, as will be appreciated in the art.

One advantage of the systems and/or methods described above is that the amount of timing error and/or uncertainty regarding the transmission time of the second timing message is reduced. The payload bit(s) which are representative of the first timing signal are reliably transmitted to and/or received by the RF module 104 at a fixed time (e.g., the interface acquisition delay time period) after the first timing signal is generated. By combining timing messages that occur close together in time (within one half of the interface acquisition delay), the timing error associated with the second timing message is reduced relative to prior art systems. For example, assuming a 32-bit timing message length on a serial interface operating at 312 MHz with an interface acquisition delay time period of 108.9 ns, if a first timing signal occurs at $t_1=0$ and a second timing signal occurs at $t_2=5$ ns, in a conventional system where serialized messages are concatenated, the first timing message would be transmitted at t=108.9 ns and the second timing message would be transmitted at t=217.2 ns. However, the expected (or theoretical) transmission time of the second timing message would be t=113.9 ns (e.g., the time of the second timing signal plus the interface acquisition delay). Thus, the timing error associated with the second timing message is $t_{err}=103.3$ ns. As described above, when the payload of the second timing message is transmitted as part of the combined timing message at t=108.9 ns, the second timing signal may be received and/or deconstructed by the RF module at that time. As such, the timing error associated with the second timing message is $t_{err}=5$ ns (e.g., the difference between the expected (or theoretical) transmission time of the second timing message and the actual transmission time). As a result, the overall worst case timing error associated with the second timing message in the transceiver 100 described above is reduced by a factor of two relative to conventional timing message transmission methods.

It should be appreciated that although the timing message transmission process 200 is described above in the context of two timing signals, the timing message transmission process 200 may be adapted to accommodate any number of timing signals. In this regard, a third timing signal may be received at a receiving a third timing signal at a third time, such that the third timing signal is received after the first and second timing signals. If the difference between the third time and the first time is less than one half of the interface acquisition delay, the timing message transmission process 200 may generate a combined timing message representative of the first timing signal, the second timing signal, and the third timing signal. For example, the message generation module 114 may generate a third timing message based on the third timing signal and perform a logical OR operation to combine the third timing message with the first and second timing messages to produce a combined timing message representative of all three timing signals, in a similar manner as described above (tasks 210, 212, 214). In this regard, the timing error for subsequent timing signals which occur very close in time relative to the first timing signal is significantly reduced relative to conventional concatenation methods, as will be appreciated in the art.

In summary, systems, devices, and methods configured in accordance with example embodiments of the subject matter relate to:

A method is provided for transmitting a message over a serial interface. In an exemplary embodiment, the method comprises receiving a first signal at a first time and receiving a second signal at a second time, the second time being after the first time. If a difference between the second time and the first time is less than a threshold time period, the method further comprises generating a first message that is representative of the first signal and the second signal and transmitting the first message over the serial interface. In accordance with one embodiment, the serial interface has an interface acquisition delay time period associated with transmission, wherein the threshold time period is equal to one half of the interface acquisition delay time period. The method further comprises receiving a first timing signal at the first time and receiving a second timing signal at the second time. The method further comprises generating a combined timing message representative of the first timing signal and the second timing signal, and transmitting the combined timing message over the serial interface. In another embodiment, transmitting the combined timing message comprises transmitting the combined timing message at a transmit time equal to the first time plus the interface acquisition delay time period.

In accordance with one embodiment, generating the first message comprises generating a first timing message based on the first signal, generating a second timing message based on the second signal, and combining the first timing message and the second timing message to obtain the first message. In accordance with one embodiment, combining the first timing message and the second timing message comprises performing an OR operation on the first timing message and the second timing message. In another embodiment, the first timing message has a first payload and the second timing message has a second payload, wherein combining the first timing message and the second timing message comprises performing an OR operation on the first payload and the second payload. In yet another embodiment, receiving the first signal comprises receiving a first timing accurate strobe signal at the first time, receiving the second signal comprises receiving a second timing accurate strobe signal at the second time, and generating the first message comprises generating a combined timing accurate strobe message. The combined timing accurate strobe message is representative of the first timing accurate strobe signal and the second timing accurate strobe signal. In yet another embodiment, if the difference between the second time and the first time is greater than the first time period, the method further comprises generating a first timing message based on the first signal, transmitting the first timing message over the serial interface, generating a second timing message based on the second signal, and transmitting the second timing message over the serial interface, wherein the second timing message is transmitted after the first timing message.

In another embodiment, a baseband module configured to transmit messages over a serial interface is provided. In an exemplary embodiment, the baseband module comprises a serial port and a scheduling module coupled to the serial port. The scheduling module is configured to transmit timing messages over the serial interface via the serial port with an interface acquisition delay time period. A message generation module is coupled to the scheduling module. The message generation module is configured to receive a first timing signal at a first time and receive a second timing signal at a second time, the second time being after the first time. The message generation module generates a combined timing message when a difference between the second time and the first time is less than a threshold time period and provides the combined timing message to the scheduling module, wherein the combined timing message is transmitted via the serial port. The combined timing message is representative of the first timing signal and the second timing signal.

In accordance with one embodiment, the message generation module generates the combined timing message by generating a first timing message based on the first timing signal, generating a second timing message based on the second timing signal, and combining the first timing message and the second timing message. In one embodiment, the message generation module combines the first timing message and the second timing message by performing an OR operation on the first timing message and the second timing message. In another embodiment, the first timing message has a first payload and the second timing message has a second payload, wherein the message generation module combines the first timing message and the second timing message by performing an OR operation on the first payload and the second payload. In accordance with one embodiment, the scheduling module transmits the combined timing message at a transmit time equal to the first time plus the interface acquisition delay time period. In yet another embodiment, the message generation module is configured to receive a first timing accurate strobe signal at the first time, receive a second timing accurate strobe signal at the second time, and generate a combined timing accurate strobe message representative of the first timing accurate strobe signal and the second timing accurate strobe signal.

In accordance with another embodiment, a transceiver is provided. The transceiver comprises a baseband module coupled to the serial interface and a radio frequency module coupled to the serial interface. The baseband module generates a first strobe signal at a first time and generates a second strobe signal at a second time, the second time being after the first time. The baseband module is configured to generate a combined message based on the first strobe signal and the second strobe signal if a difference between the second time and the first time is less than a threshold time period. The baseband module transmits the combined message over the serial interface at a transmit time which occurs after the first time. The radio frequency module is configured to receive the combined message via the serial interface and deconstruct the combined message into the first strobe signal and the second strobe signal.

In accordance with one embodiment, the radio frequency module is configured to adjust a first characteristic of the radio frequency module based on the first strobe signal and adjust a second characteristic of the radio frequency module based on the second strobe signal. In another embodiment, the radio frequency module comprises a transmitter lineup and a control module coupled to the serial interface and the transmitter lineup. The control module is configured to adjust a first characteristic of the transmitter lineup based on the first strobe signal and adjust a second characteristic of the transmitter lineup based on the second strobe signal. In accordance with another embodiment, the baseband module is configured to generate a first message based on the first strobe signal, generate a second message based on the second strobe signal, and combining the first message and the second message to obtain the combined message. In accordance with one embodiment, the first message has a first payload and the second message has a second payload, wherein the baseband module is configured to logically OR the first payload and the second payload. In another embodiment, the baseband module is configured to generate a first timing accurate strobe signal at the first time, generate a second timing accurate strobe signal at the second time, and generate a combined timing accurate strobe message based on the first timing accurate strobe signal and the second timing accurate strobe signal.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. For example, although a RF transceiver has been described as one possible application, the various embodiments of the subject matter described herein may be implemented in any system that utilizes serialized communications (e.g., packet-based or message-based communications) to communicate timing information between components.

What is claimed is:

1. A method for transmitting a message over a serial interface, the method comprising:
   receiving a first signal at a first time, the first signal indicating a first timing reference for a first action;
   receiving a second signal at a second time, the second signal indicating a second timing reference for a second action, the second action being different from the first action, the second time being after the first time; and
   if a difference between the second time and the first time is less than a threshold time period:
   generating a first message, the first message being representative of the first signal and the second signal; and
   transmitting the first message over the serial interface.

2. The method of claim 1, wherein generating the first message comprises:
   generating a first timing message based on the first signal;
   generating a second timing message based on the second signal; and
   combining the first timing message and the second timing message to obtain the first message.

3. The method of claim 2, wherein combining the first timing message and the second timing message comprises performing an OR operation on the first timing message and the second timing message.

4. The method of claim 2, the first timing message having a first payload and the second timing message having a second payload, wherein combining the first timing message and the second timing message comprises performing an OR operation on the first payload and the second payload.

5. The method of claim 1 wherein:
receiving the first signal comprises receiving a first timing accurate strobe signal at the first time;
receiving the second signal comprises receiving a second timing accurate strobe signal at the second time; and
generating the first message comprises generating a combined timing accurate strobe message, the combined timing accurate strobe message being representative of the first timing accurate strobe signal and the second timing accurate strobe signal.

6. The method of claim 1, wherein if the difference between the second time and the first time is greater than the threshold time period, the method further comprises:
generating a first timing message based on the first signal;
transmitting the first timing message over the serial interface;
generating a second timing message based on the second signal; and
transmitting the second timing message over the serial interface, wherein the second timing message is transmitted after the first timing message.

7. A baseband module configured to transmit messages over a serial interface, the baseband module comprising:
a serial port;
a scheduling module coupled to the serial port, the scheduling module being configured to transmit timing messages over the serial interface via the serial port with an interface acquisition delay time period;
a message generation module coupled to the scheduling module, the message generation module being configured to:
receive a first timing signal corresponding to a first action at a first time;
receive a second timing signal corresponding to a second action at a second time, the second time being after the first time;
generate a combined timing message when a difference between the second time and the first time is less than a threshold time period, the combined timing message being representative of the first timing signal and the second timing signal; and
provide the combined timing message to the scheduling module, wherein the combined timing message is transmitted via the serial port.

8. The baseband module of claim 7, wherein the message generation module is configured to generate the combined timing message by:
generating a first timing message based on the first timing signal;
generating a second timing message based on the second timing signal; and
combining the first timing message and the second timing message.

9. The baseband module of claim 8, wherein the message generation module is configured to combine the first timing message and the second timing message by performing an OR operation on the first timing message and the second timing message.

10. The baseband module of claim 8, wherein:
the first timing message has a first payload;
the second timing message has a second payload; and
the message generation module is configured to combine the first timing message and the second timing message by performing an OR operation on the first payload and the second payload.

11. The baseband module of claim 8, wherein the scheduling module is configured to transmit the combined timing message at a transmit time, the transmit time being equal to the first time plus the interface acquisition delay time period.

12. The baseband module of claim 7, wherein the message generation module is configured to:
receive a first timing accurate strobe signal at the first time;
receive a second timing accurate strobe signal at the second time; and
generate a combined timing accurate strobe message, the combined timing accurate strobe message being representative of the first timing accurate strobe signal and the second timing accurate strobe signal.

13. A transceiver comprising:
a baseband module coupled to the serial interface, the baseband module being configured to:
generate a first strobe signal at a first time;
generate a second strobe signal at a second time, the second time being after the first time;
generate a combined message based on the first strobe signal and the second strobe signal if a difference between the second time and the first time is less than a threshold time period; and
transmit the combined message over the serial interface at a transmit time, the transmit time being after the first time; and
a radio frequency module coupled to the serial interface, the radio frequency module being configured to:
receive the combined message via the serial interface;
deconstruct the combined message into the first strobe signal and the second strobe signal;
adjust a first characteristic of the radio frequency module based on the first strobe signal; and
adjust a second characteristic of the radio frequency module based on the second strobe signal.

14. The transceiver of claim 13, wherein the radio frequency module comprises:
a transmitter lineup; and
a control module coupled to the serial interface and the transmitter lineup, the control module being configured to:
adjust a first characteristic of the transmitter lineup based on the first strobe signal; and
adjust a second characteristic of the transmitter lineup based on the second strobe signal.

15. The transceiver of claim 13, wherein the baseband module is configured to generate the combined message by:
generating a first message based on the first strobe signal;
generating a second message based on the second strobe signal; and
combining the first message and the second message.

16. The transceiver of claim 15, the first message having a first payload and the second message having a second payload, wherein the baseband module is configured to logically OR the first payload and the second payload.

17. The transceiver of claim 13, wherein:
the first strobe signal comprises a first timing accurate strobe signal;
the second strobe signal comprises a second timing accurate strobe signal; and the combined message comprises a combined timing accurate strobe message based on the first timing accurate strobe signal and the second timing accurate strobe signal.

18. A method for transmitting a message over a serial interface having an interface acquisition delay time period associated with transmission, the method comprising:
   receiving a first timing signal at a first time;
   receiving a second timing signal at a second time, the second time being after the first time; and
   if a difference between the second time and the first time is less than one half of the interface acquisition delay time period:
      generating a combined timing message, the combined timing message being representative of the first timing signal and the second timing signal; and
      transmitting the combined timing message over the serial interface.

19. The method of claim 18, wherein transmitting the combined timing message comprises transmitting the combined timing message at a transmit time, the transmit time being equal to the first time plus the interface acquisition delay time period.

20. A baseband module configured to transmit messages over a serial interface, the baseband module comprising:
   a serial port;
   a scheduling module coupled to the serial port, the scheduling module being configured to transmit timing messages over the serial interface via the serial port with an interface acquisition delay time period;
   a message generation module coupled to the scheduling module, the message generation module being configured to:
      receive a first timing signal at a first time;
      receive a second timing signal at a second time, the second time being after the first time;
      generate a combined timing message when a difference between the second time and the first time is less than a threshold time period, the combined timing message being representative of the first timing signal and the second timing signal; and
      provide the combined timing message to the scheduling module, wherein the combined timing message is transmitted via the serial port, wherein the scheduling module is configured to transmit the combined timing message at a transmit time equal to the first time plus the interface acquisition delay time period.

* * * * *